(12) United States Patent
Hirth et al.

(10) Patent No.: US 6,908,121 B2
(45) Date of Patent: Jun. 21, 2005

(54) LOCKING ARRANGEMENT FOR A THREADED CONNECTOR

(75) Inventors: David Eugene Hirth, Pasadena, TX (US); Tarald Gudmestad, Houston, TX (US); Mark J. Murray, Sugar Land, TX (US); Gerald Dean Pedersen, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/277,177

(22) Filed: Oct. 21, 2002

(65) Prior Publication Data

US 2003/0122373 A1 Jul. 3, 2003

Related U.S. Application Data

(60) Provisional application No. 60/353,096, filed on Jan. 30, 2002, and provisional application No. 60/350,406, filed on Oct. 22, 2001.

(51) Int. Cl.[7] ............................................... F16L 55/00
(52) U.S. Cl. .................... 285/318; 285/92; 285/305; 285/333
(58) Field of Search ................................ 285/305, 318, 285/330, 333, 334, 81, 92, 148.6; 166/214

(56) References Cited

U.S. PATENT DOCUMENTS

| | | | | |
|---|---|---|---|---|
| 1,769,381 A | * | 7/1930 | Montgomery | 285/18 |
| 1,781,091 A | | 11/1930 | Wilson | |
| 2,013,660 A | * | 9/1935 | Lauer | 285/305 |
| 2,341,670 A | * | 2/1944 | Stinson | 285/334 |
| 2,418,418 A | * | 4/1947 | Erie et al. | 416/209 |
| 2,436,407 A | * | 2/1948 | Stephens | 220/378 |
| 2,597,482 A | * | 5/1952 | Harrison et al. | 285/305 |
| 2,751,238 A | * | 6/1956 | Vegren | 403/316 |
| 3,062,568 A | * | 11/1962 | Andresen et al. | 285/333 |
| 3,295,872 A | * | 1/1967 | Kragle | 403/350 |
| 4,003,401 A | * | 1/1977 | Haring | 137/599.18 |
| 4,426,105 A | * | 1/1984 | Plaquin et al. | 285/92 |
| 4,491,351 A | * | 1/1985 | Galle et al. | 285/318 |
| 4,512,596 A | | 4/1985 | Obrecht | |
| 4,659,119 A | | 4/1987 | Reimert | |
| 5,255,945 A | * | 10/1993 | Toon | 285/305 |
| 5,520,422 A | * | 5/1996 | Friedrich et al. | 285/318 |
| 5,743,333 A | * | 4/1998 | Willauer et al. | 166/122 |
| 5,785,092 A | * | 7/1998 | Friedrich et al. | 138/133 |
| 6,155,613 A | * | 12/2000 | Quadflieg et al. | 285/334 |

FOREIGN PATENT DOCUMENTS

| | | | |
|---|---|---|---|
| DE | 392878 | 3/1924 | |
| DE | 3413792 | 11/1985 | |
| FR | 2742177 | 6/1997 | |
| GB | 2 177 479 A | 1/1987 | F16D/3/50 |
| JP | 11141766 | 5/1999 | |
| WO | WO 90/11455 | 10/1990 | F16B/7/18 |

OTHER PUBLICATIONS

PCT International Report, International Application No. PCT/GB 02/04745, dated Feb. 6, 2003.
U.K. Office Action, Application No. GB0400469.3, dated Sep. 7, 2004.

* cited by examiner

*Primary Examiner*—James M. Hewitt
(74) *Attorney, Agent, or Firm*—Moser, Patterson & Sheridan, L.L.P.

(57) ABSTRACT

A connector arrangement used for connecting and locking tubular members. The connector consists of two tubular members and a coupling member. The tubular members are threaded together to create a threaded connection. The locking arrangement is provided by a pathway formed on the tubular member whereby a locking member can be inserted in to the pathway to lock the threaded connection. The locking arrangement is also provided by a plurality of castellation members disposed on each tubular member. The connector also has a separate coupling member which has opposite right-hand and left-hand threaded ends to threadedly mate with the threads of the two tubular members.

29 Claims, 9 Drawing Sheets

LOCKING ARRANGEMENT FOR A THREADED CONNECTOR

CROSS-REFERENCE TO RELATED APPLICATIONS

This application claims priority to two pending U.S. provisional patent applications, the first of which is entitled "Locking Arrangement for a Threaded Connector," filed on Oct. 22, 2001, and having Prov. Ser. No. 60/350,406, and the second of which is entitled "Interlocking Threaded Connector," filed on Jan. 30, 2002, and having Prov. Ser. No. 60/353,096.

BACKGROUND OF THE INVENTION

1. Field of the Invention

The present invention relates to apparatus and methods for connecting two tubulars. Particularly, the present invention provides a locking means for a connection. More particularly, the present invention provides an apparatus and method of preventing a threaded connection from becoming unmade in a wellbore in response to rotational movement of the tubulars in a string of tubulars. More particularly still, the present invention relates to apparatus and methods for connecting tubulars together to produce a connection that has high bi-directional torque resistance.

2. Description of the Related Art

In order to access hydrocarbons in subsurface formations, it is typically necessary to drill a borehole into the earth. The process of drilling this borehole and of subsequently completing the borehole in order to form a wellbore requires the use of various tubulars.

Threaded connections are often used to connect multiple tubular members end-to-end and between tubular members that transmit torque. This is usually accomplished by providing tubulars that have a simple male to female-shouldered connection. The tubulars are connected, or "made up," by transmitting torque against one of the tubulars while the other tubular is held stationary. Torque is transmitted in a single direction in accordance with the direction corresponding with connection make-up. Any torque applied to a joint in the make-up direction will have the effect of continuing to tighten the joint.

Problems are often encountered in wellbore operations wherein the tubular connections become disconnected. For example, rotation of the tubular string in the direction opposite of make-up creates a potential that one of the tubular connections can become disengaged if make-up torque is exceeded. More specifically, any torque applied in the direction opposite of make-up creates the potential that one or more of the tubular connections will start to unthread.

Methods have been employed to obtain bi-directional torque holding capabilities for connections. Some examples of these bi-directional setting devices include set screws, jam nuts, lock washers, keys, cross/thru-bolting, lock wires, clutches and thread locking compounds. However, these solutions have shortcomings. For example, many of these methods used to obtain bi-directional torque capabilities are limited by friction between component surfaces or compounds that typically result in a relative low torque resistant connection. For applications that require high bi-directional torque capabilities, only positive locking methods such as keys, clutches or cross/through-bolting are typically effective. Further, the high bidirectional torque connections identified above require both turning and milling operations to manufacture, which increase the cost of the connection over just a turning operation required to manufacture a simple male to female-threaded connection. The high bidirectional torque connections identified above also require significant additional components as compared to a simple male to female-threaded connection which adds to the cost.

There is a need therefore, for a locking arrangement between two threaded members that prevents movement between the members. There is a further need for a locking means that can be selectively installed in a threaded connection after the connection is made. There is yet a further need for a locking apparatus that prevents movement of the threaded parts of a connection in either of at least two directions. There is yet a further need for a connector for tubulars that does not require a separate, non-threaded component for locking. Further still, there is a need for a tubular connector capable of locking the tubulars together simply through rotational forces.

SUMMARY OF THE INVENTION

The present invention provides a connector arrangement for connecting a first tubular to a second tubular. In one embodiment, the connection consists of a male and female member. Each member contains at least two helical profiles that differ in lead and/or direction, where at least one of the profiles consists of a groove(s) that when assembled with the mating member can be aligned to permit the installation of at least one locking member. When the locking member is installed, the mating members form a connection that is locked and prevented from rotational movement in both directions along with being restrained from axial movement. In operation, the male threads of the first tubular member are threadedly connected to the female threads of the second tubular. As these threads are made up, the tubular members are drawn together to a point that they become physically connected or engaged which creates a threaded connection. Once physically connected, the helical grooves formed in each of the tubular members are aligned so as to form a substantially rectangular path between the outer surface of one tubular component and the inner surface of the other tubular component. A locking member is then inserted into the rectangular path formed from the alignment of the helical grooves to lock the threaded connection. Once inserted, the locking member prevents any axial or rotational movement between the two tubular components. With the threaded connection locked, the tubulars with the connection therebetween can be used to transmit torque in either direction.

In another embodiment, a connector arrangement consists of two tubular members and a coupling member. The first tubular member has a right-hand thread of any thread form, and the second tubular member has a left-hand thread of any thread form. In addition to the threads, each tubular member has a clutched nose profile consisting of a plurality of castellation members. The coupling member has opposite right-hand and left-hand threaded ends to threadedly mate with the threads of the two tubular members. In operation, the right-hand threads of the coupling member are threadedly connected to the left-hand threads of the second tubular. In addition, the left-hand threads of the coupling member are threadedly connected to the right-hand threads of the first tubular. As these threads are made up, the castellations of the tubular members are aligned so as to interlock with each other. Rotation of the coupling member relative to the two tubulars brings together the castellations of the two tubulars in an interlocking engagement. The result is a connection that is not only restrained from axial movement, but is also locked from rotational movement in both directions.

BRIEF DESCRIPTION OF THE DRAWINGS

So that the manner in which the above recited features and advantages of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
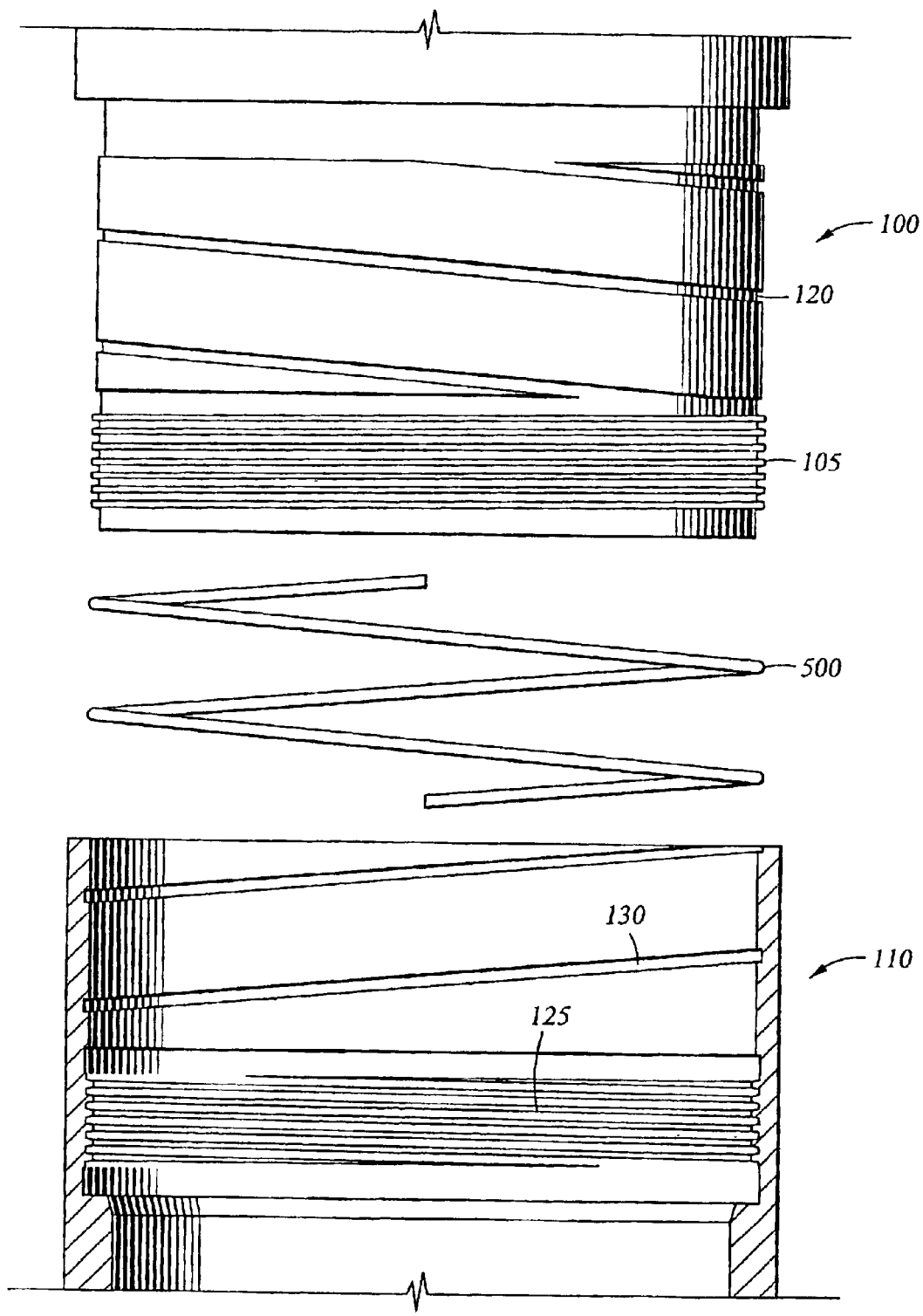
FIG. 1 is an elevational view of a male threaded component having a helical grooved formed in its outer surface and a section view of a female-threaded component having a helical groove formed in its inner surface.

FIG. 1 is an elevational view of a male-threaded component 100 having a helical groove 120 formed in its outer surface and a section view of a female-threaded component 110 having a helical groove 130 formed in its inner surface. Typically, component 100 is a tubular member having male threads at an end thereof and component 110 would be another tubular member having internally formed threads formed at an end thereof. Although a helically-shaped groove is shown and described, the groove or recess profile could reflect an infinite number of profiles. The male-threaded component 100 includes conventional threads 105 at a lower end thereof. The threads 105 are designed to provide a connection fastening between the male-threaded component 100 and the female-threaded component 110 as the two are rotated against each other. Also formed on an outer surface of the component 100 is a continuous helical groove 120 formed at a reverse angle from the threads 105. The groove 120 begins from an upper end of the component 100 and terminates at a location proximate the threads 105.

Female-threaded component 110 also includes threads 125 formed at the interior of a lower end thereof. The threads 125 are constructed and arranged to receive the outer threads 105 of the male-threaded component 100 in order to fasten the two components 100, 110 together. Female-threaded component 110 also includes a helical groove or mating groove 130 formed in its inner surface to mate with the helical groove 120 of the male-threaded component 100. Shown also in FIG. 1 is a locking member 500 constructed and arranged to be held within the mating grooves 120, 130 of the components after they are threaded together, thereby preventing the relative rotation therebetween.

Figure 2:
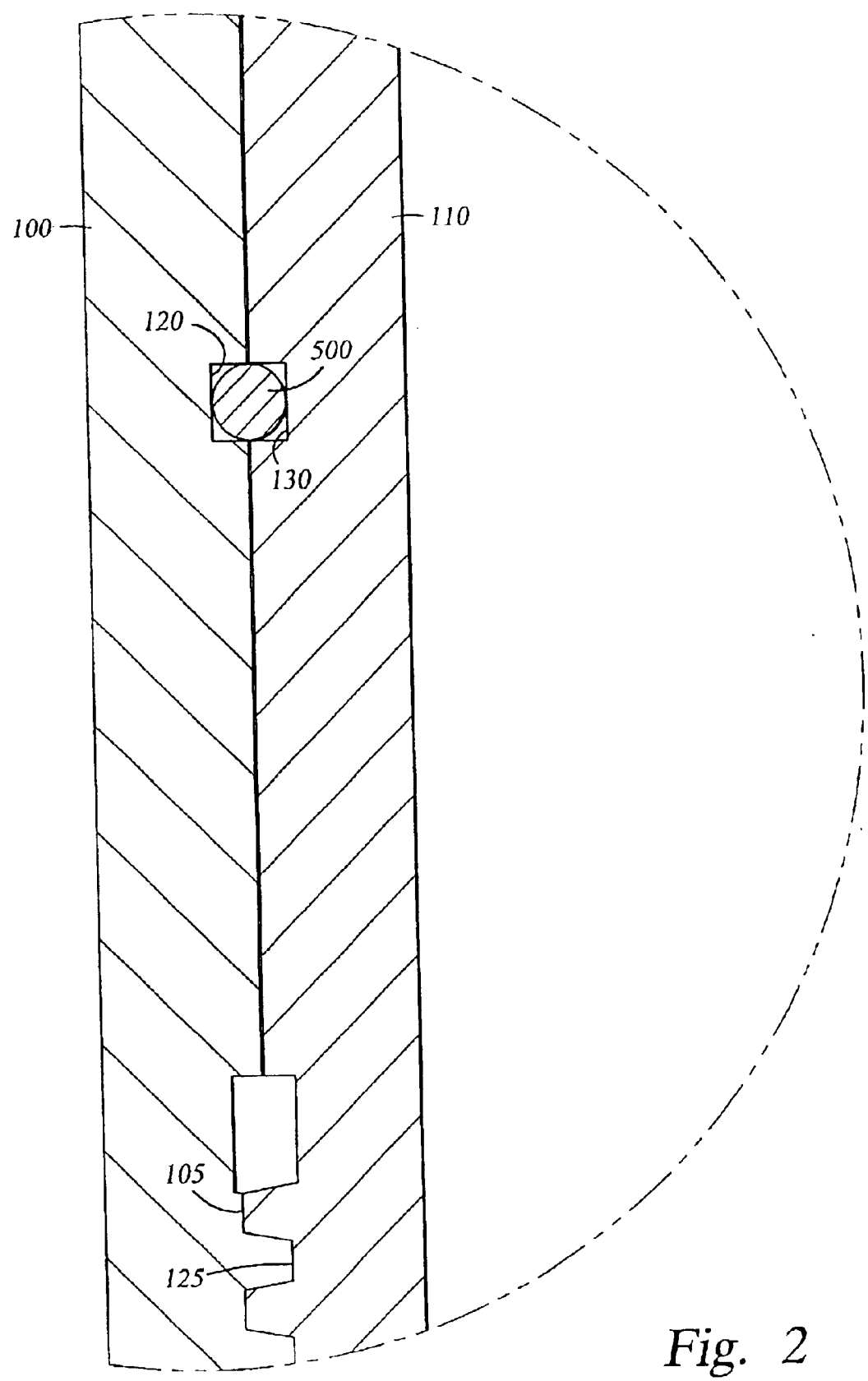
FIG. 2 is an enlarged section view of the components of FIG. 1 after a threaded connection has been made and the helical grooves formed in each component are aligned.

FIG. 2 is an enlarged section view of the components 100, 110 of FIG. 1 after a threaded connection has been made and the helical grooves 120, 130 formed in each component 100, 110 are aligned. As illustrated, the threads 105 of component 100 mate with threads 125 of component 110, thereby physically connecting the components 100, 110. In addition to the threaded connection, the mating grooves 120, 130 of the component 100, 110 align to form a substantially rectangular path or pathway between the mating surfaces of components 100, 110. Also illustrated in FIG. 2 is a locking member 500 which has been inserted into the rectangular path and extended therein. In the illustration of FIG. 2, the locking member 500 is a flexible metallic device such as wire. With the mating grooves 120, 130 aligned and the locking member 500 inserted therein, any axial or rotational movement between the components 100, 110 is prevented due to the direction and/or lead of the grooves 120, 130. For instance, any tightening or untightening of the threaded connection between the threads 105, 125 will be prevented by the various surfaces of the aligned grooves 120, 130 and the locking member 500. In this manner, the threaded connection between the components 100, 110 can be locked after the connection is made. With the connection locked, tubulars with the connection therebetween can be used to transmit torque in either direction.

Figure 3:
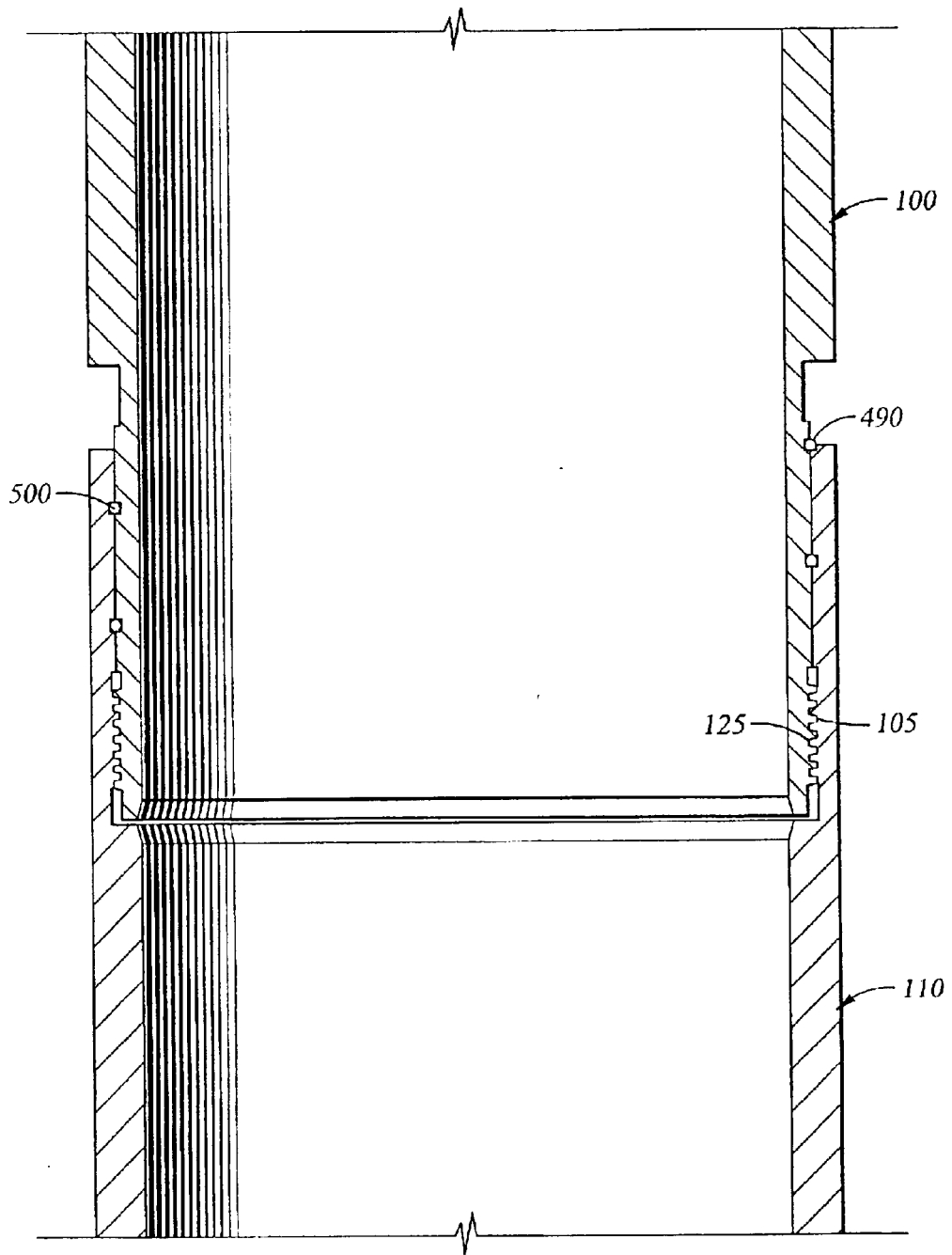
FIG. 3 is a section view of the components of FIGS. 1 and 2 after a threaded connection has been made.

FIG. 3 is a section view of the components 100, 110 of FIGS. 1 and 2 after a threaded connection has been made. Specifically, male component 100 and female component 100 are threaded together with threads 105, 125. Visible in FIG. 3 are the mating grooves (not labeled) that form a pathway through the surface of the components. At one end, the pathway is accessible from the outside at a port 490, permitting insertion of locking member 500. The helical travel of the path is visible between the right and left sides of the connection.

Figure 4:
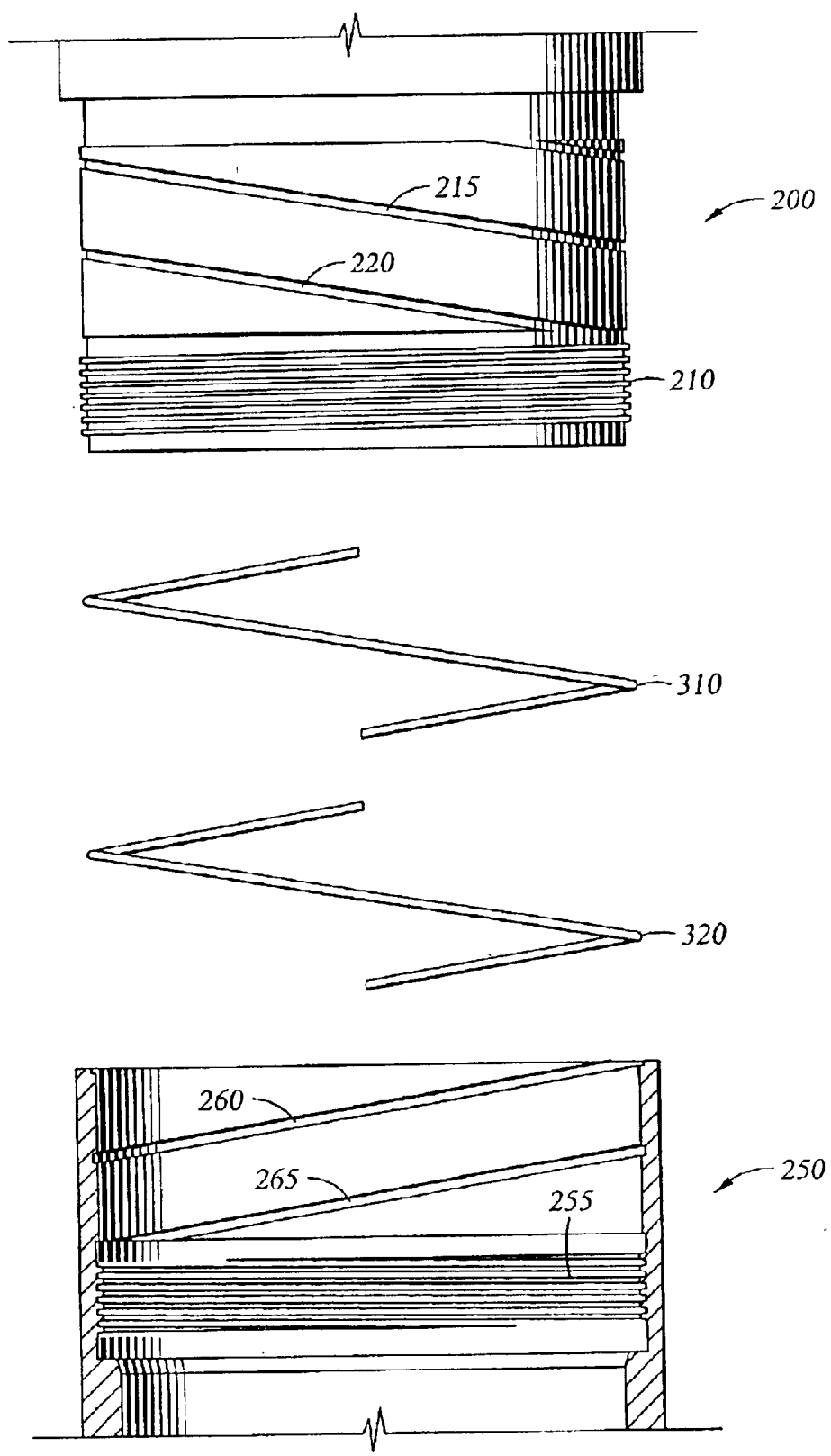
FIG. 4 is a elevational view of a male-threaded component with two independent helical grooves formed in an outer surface and a section view of a female-threaded component having two mating, helical grooves formed in an inner surface.

FIG. 4 shows a male-threaded component 200 with two independent helical grooves 215, 220 formed in an outer surface. In FIG. 4, male-threaded component 200 includes conventional threads 210 formed on a lower surface thereof. FIG. 4 also shows a female-threaded component 250 having two mating helical grooves 260, 265 independently formed in an inner surface thereof and conventional threads 255 on an inner surface. Independent helical grooves 215, 220 are constructed and arranged to run at an angle opposite to the angle of the threads 210. The purpose of the two independent grooves 215, 220 is to provide a redundant locking means between the male-threaded component 200 and female-threaded component 250.

Also illustrated in FIG. 4 are two locking members 310, 320 constructed and arranged to fit within the aligned grooves 215, 220, 260, 265 of the components 200, 250 after the tubular members are threaded together.

Figure 5:
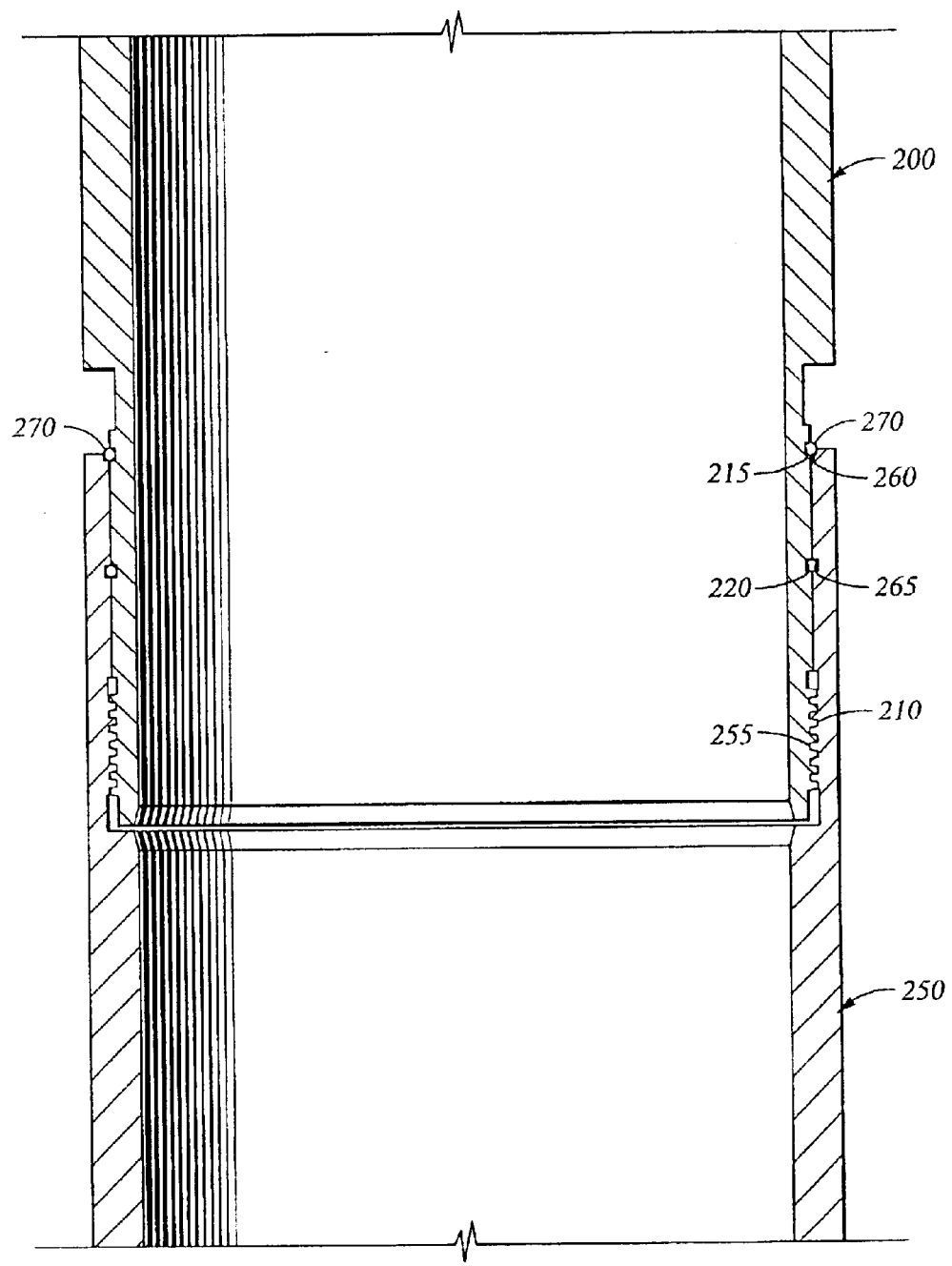
FIG. 5 is a section view of the components of FIG. 4 after a threaded connection has been made and the helical grooves formed in each component are aligned.

FIG. 5 is a section view of the components 200, 250 of FIG. 4 after a threaded connection has been made and the helical grooves 260, 215, 265, 220 formed in components 220, 250 are aligned. As illustrated in FIG. 5, the threads 210 and 255 of each component 200, 250 are mated and the components are physically attached to each other. In addition to the conventional threads 210, 255, the two independent helical grooves 260, 215, 265, 220 of each component 200, 250 have been aligned thereby forming a substantially rectangular path through the threaded connection which is accessible at two locations 270 between the two assembled components 200, 250. Utilizing the openings 270, locking members 310, 320, may be inserted and run through the helical grooves 260, 215, 265, 220, thereby locking the threaded connection to axial or rotational movement after the threads 210, 255 are made up. While the grooves 260, 215, 265, 220 in the illustrated embodiments are arranged at an angle opposite the angle of the threads 220, 255, it will be understood that the grooves 260, 215, 265, 220 could be arranged in any manner so long as there is a difference in lead and/or direction between the grooves 260, 215, 265, 220 and the threads 210, 255.

With the arrangement described, the connection between the components 200, 250 does not need to rely on a shoulder to transmit torque in either direction. The helical profiles of differing lead and/or direction prevent rotational movement when at least one locking member 310, 320 is used to mate them.

The helical profiles on both components can be readily produced on either a manual or CNC lathe with no subsequent machining operations required. The locking member 310, 320 can consist of a length of wire that can readily be purchased and cut to length with hand tools.

The lead, length, direction, and number of starts of the helical profiles, along with the length and size/shape of the locking member(s) can be altered to increase or decrease the torque handling capabilities of the connection.

In another embodiment, the connection may consist of a male and female member that have at least one mating helical thread profile and a helical groove pattern with a different lead and/or direction. Upon assembly the mating threads are threaded together until the desired engagement is obtained and then the connection is rotated until the groove patterns align between the two components. A locking member can then be installed into the aligned grooves resulting in a fully rotationally locked connection.

In another embodiment still, the connection may consist of a male and female member that have at least one helical groove pattern of a certain lead and direction and at least one helical groove pattern of another lead and/or direction. Upon assembly the members can be slid together axially until close to the desired axial position is achieved. The members can then be rotated to align one set of grooves in the helical pattern. An aligning member (wire) can then be installed between the grooves. Next, the mating members are rotated until the grooves in the other helical pattern are aligned. A locking member can then be installed into the aligned grooves Although cylindrical-shaped connecting members are the preferred shape, this method of connection may be used on non-cylindrical shaped connecting members. Although wire is the preferred locking/aligning member to install in the aligned groove(s), other suitable items that can provide resistance to shear can be used. For instance, multiple short lock members could be used. Although a square cross section wire is shown for a locking/aligning member other cross section locking/aligning members can be used such as rectangular, circular or any other geometric shape. The helical grooves to receive the locking member(s) can consist of single or multiple start grooves. If a threaded profile is used as one of the helical profiles it can consist of a single or multiple start thread. Although the locking member is intended to be inserted into the groove from an end of the connection without requiring a milled slot or hole, it could be inserted through a slot or hole. Although not shown, sealing members can be incorporated into this connection to produce a pressure tight connection.

Figure 6:
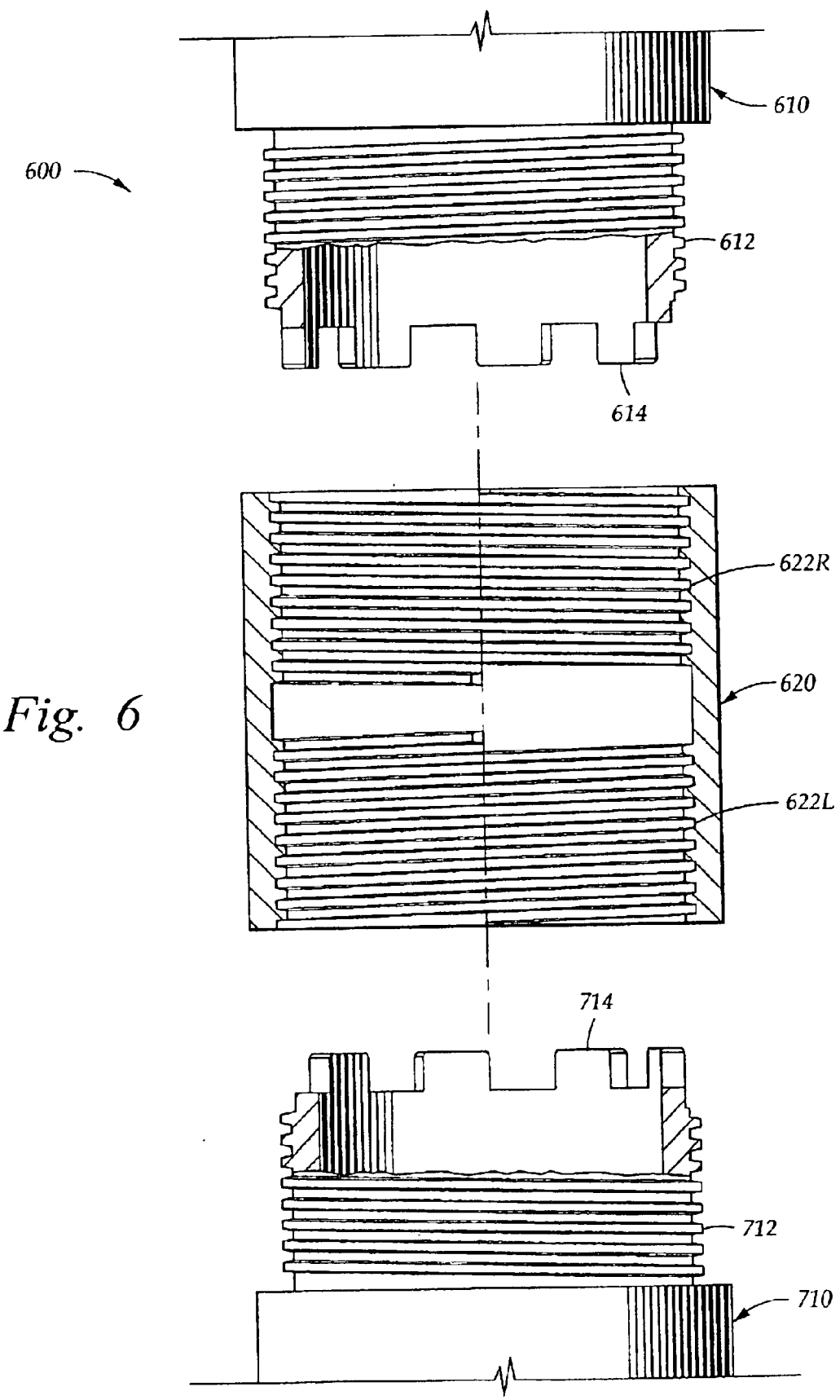
FIG. 6 is an exploded view of a connector of the present invention, with the two tubular members being shown in side view with their respective right and left-hand threads. Also visible are the castellations. Also visible, in cross-section, is the intermediate coupling member.

FIG. 6 is an exploded view of another embodiment of a connector 600 according to aspects of the present invention. As seen in FIG. 6, the connector 600 first comprises a first tubular 610 having an end. Disposed on the end of the first tubular 610 are externally formed right-hand threads 612. Also disposed on the end of the first tubular 610 are a plurality of castellations 614.

The connector 600 also includes a second tubular 710 having an end. The second tubular 710 is to be joined to the first tubular 610 through an interlocking engagement as will be disclosed. Disposed on the end of the second tubular 710 are externally formed left-hand threads 712. Also disposed on the end of the second tubular 710 are a plurality of castellations 714. The castellations 714 of the second tubular 710 are configured to mate with the castellations 614 of the first tubular 610 in an alternating, interlocking manner.

The connector 600 further includes a coupling member 620, which is shown in FIG. 6 in cross-section. The coupling 620 defines a tubular member having internally formed left 622L and right 622R hand threads. The left 622L and right 622R hand threads are machined into the coupling 620 at opposite ends. The internal right-hand threads 622R of the coupling 620 are constructed and configured to be threadedly connected to the external right-hand threads 612 of the first tubular 610. Similarly, the internal left-hand threads 622L of the coupling 620 are constructed and configured to be threadedly connected to the left-hand threads 712 of the second tubular 710. In this way, the two tubulars 610 and 710 are joined together through a threaded connection via the coupling 620.

FIG. 6 shows the first 610 and second 710 tubulars ready to be made up with the right 622R and left 622L hand threads of the coupling member 620.

Figure 7:
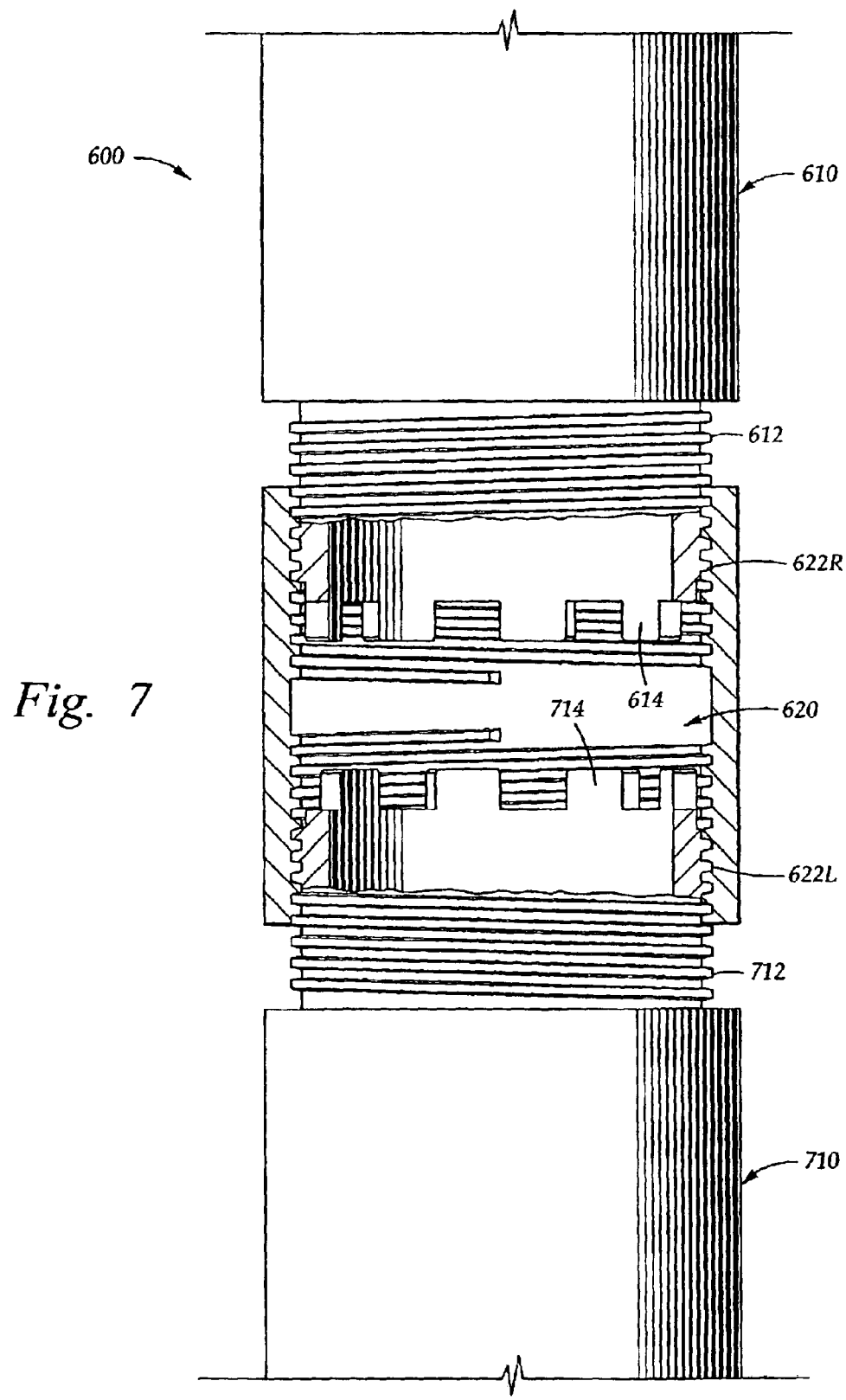
FIG. 7 is a side view of a connector of the present invention, with the two tubular members again being shown in side view with their respective right and left hand threads. The two tubular members are being rotationally made up to the coupling member. Visible in this arrangement are the castellations being positioned to align for interlocking.

FIG. 7 is a side view demonstrating the makeup of the tubulars 610, 710 to the coupling member 620. Make-up is preferably done by rotating the coupling member 620 in the make-up direction so as to threadedly connect both the first tubular 610 and the second tubular 710 to the coupling member 620 simultaneously. During the make-up process, the castellations 614, 714 of the two tubulars 610, 710 are aligned for interlocking. In this respect, the castellations 714 of the second tubular 710 are configured to mate with the castellations 614 of the first tubular 610. Once the tubulars 610, 710 are threadedly connected with the coupling member 620, the coupling 620 is rotated in one direction so that the tubulars 610, 710 are drawn together. The coupling 620 is rotated until the castellations 614 of the first tubular 610 are interlocked with the castellations 714 of the second tubular 710. The result is a connection 600 that is locked from rotational movement in both directions as shown in FIG. 8.

As illustrated further in FIG. 7, right-hand threads 612 of the first tubular 610 are rotatably mated with right-hand threads 622R of the coupling member 620 so that the first tubular 610 and the coupling member 620 are physically connected. Also illustrated in FIG. 7, the left-hand threads 712 of the second tubular 620 are rotatably mated with left-hand threads 622L of the coupling member 620 so that the second tubular 710 and the coupling member 620 are physically connected. As can also be seen in FIG. 7, castellations 614, 714 of the two tubulars 610, 710 are aligned so that they will properly engage and interlock one another as coupling member 620 is rotated in one direction and the tubulars 610, 710 are brought together. In this way, the castellations 614 and 714 will mate and interlock in order to serve as a locking device. With the interlocking of the castellations 614 and 714, the tubulars 610, 710 will be prevented from any relative axial or rotational movement. For instance, any tightening or untightening of the threaded connection 600 between the threads of the tubulars 610, 710 and coupling member 620 will be prevented by the various surfaces of the aligned castellations 614 and 714 acting as a locking device.

Figure 8:
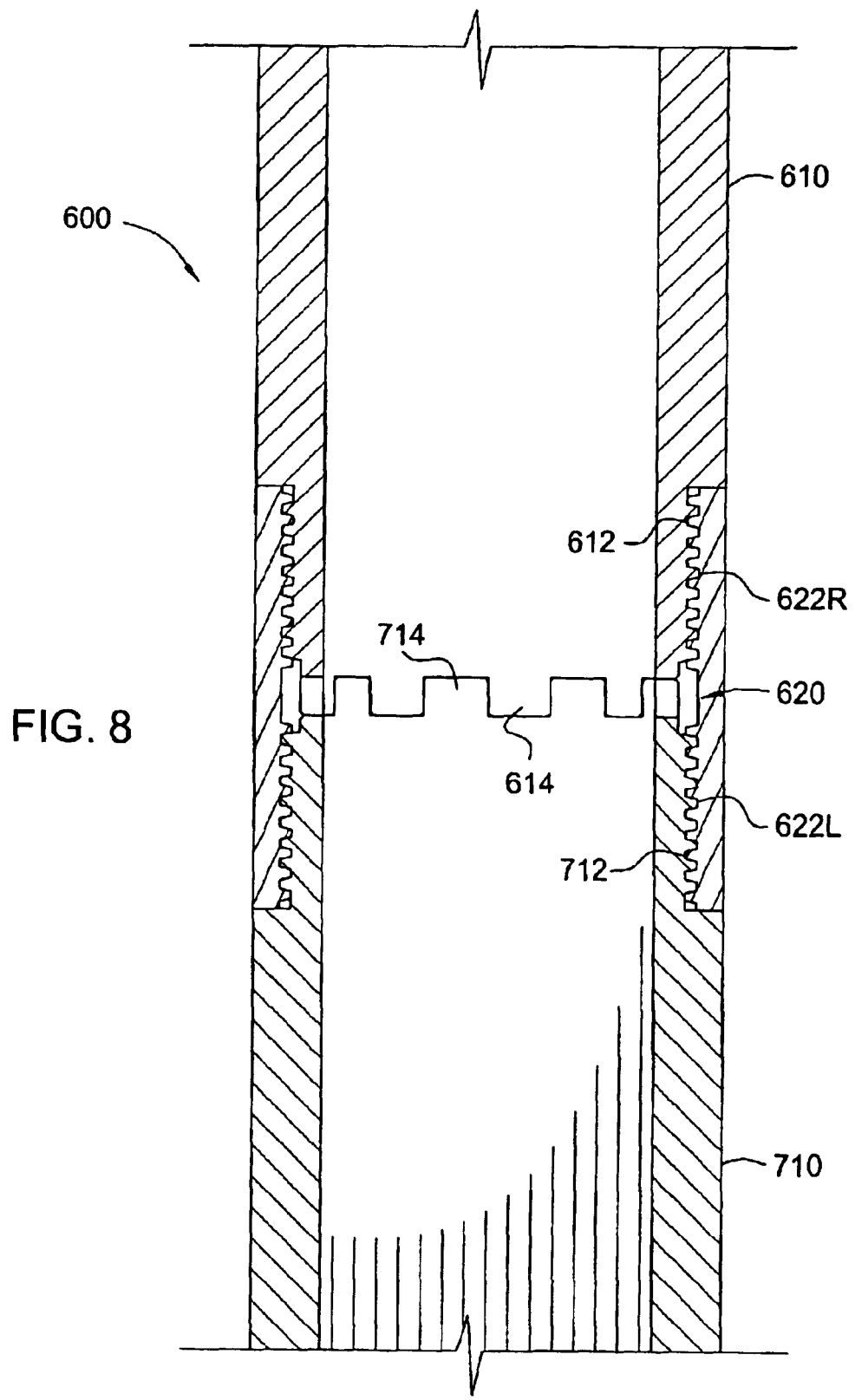
FIG. 8 is a cross-sectional view of the components of FIGS. 6 and 7 after threaded connection has been made and the castellations have been interlocked.

FIG. 8 is a cross-sectional view of the components 610, 710, 620 of FIGS. 6 and 7 after threaded connection has been made and the castellations 614, 714 have been interlocked. To this end, the castellations 614, 714 are in alignment. The only way to unlock the tubulars 610, 710 from each other is to rotate the coupling member 620 in the direction opposite of that which was used to make up the connection 600. In this way, downhole torque applied to the tubulars 610, 710 in either direction can be applied without the possibility of the connector 600 becoming unthreaded or unmade.

With the connector 600 described above, the connection between two tubulars 610, 710 does not need to rely on a shoulder to transmit torque in either direction. Also, the connector 600 does not rely on any thread-induced loads to transmit torque in any direction. In addition, the connector 600 provides positive torque transmission through the engaged and interlocked castellations 614, 714.

Figure 9:
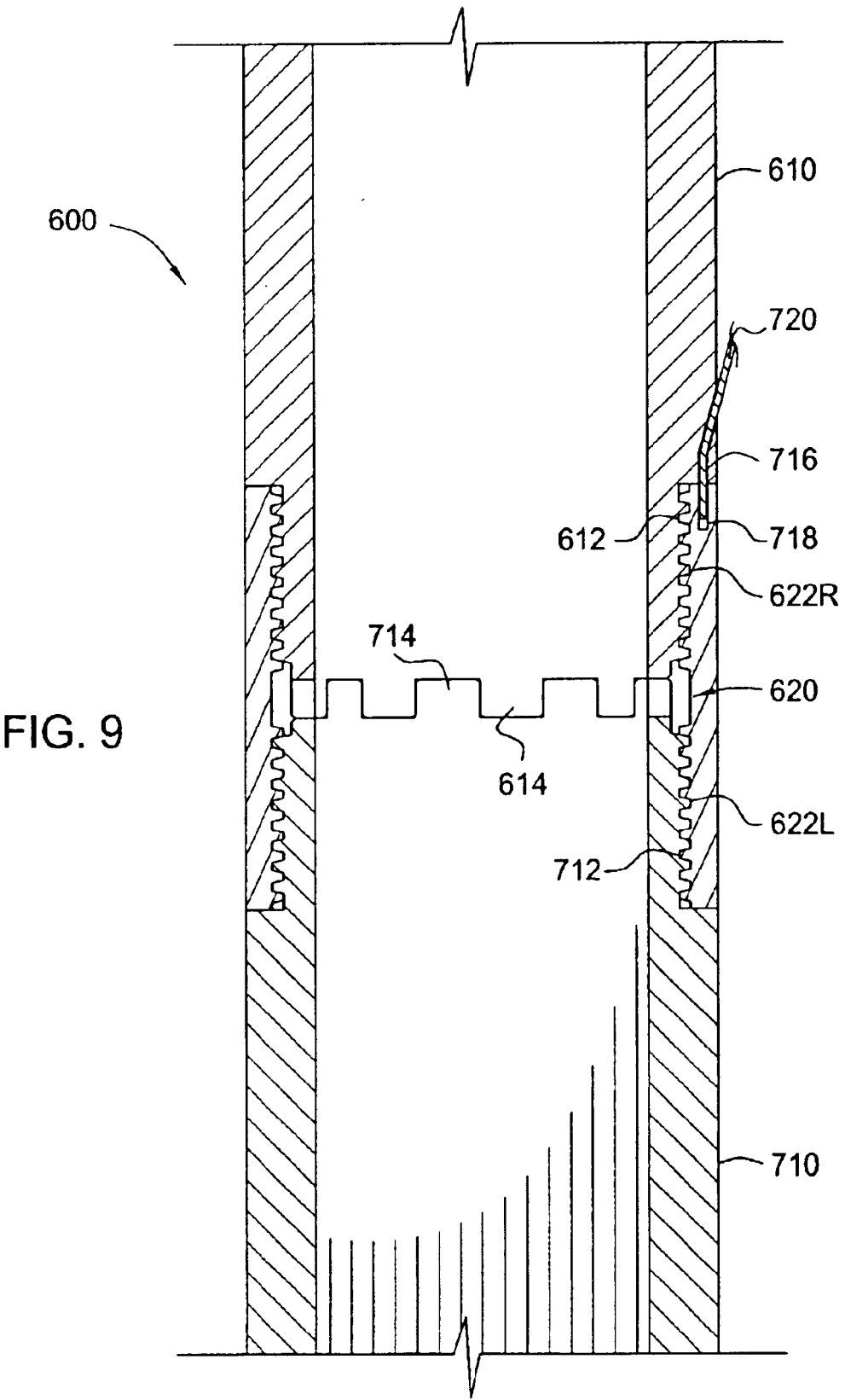
FIG. 9 is a cross-sectional view of the components of FIGS. 6, 7 and 8 after threaded connection has been made and the castellations have been interlocked and the locking member has been inserted into the pathway formed by the alignment of the receiving members.

FIG. 9 is a cross-sectional view of the components 610, 710, 620 of FIGS. 6, 7 and 8 after threaded connection has been made and the castellations 614, 714 have been interlocked. In another embodiment, a backup locking device may be used to maintain the threaded connection. Preferably, the backup locking device includes a first receiving member 716 formed in the exterior wall of the tubular 610. In addition, coupling member 620 has a second receiving member 718 formed in the exterior wall thereof. After the threaded connection has been made in a manner described above, a locking member 720, such as a wire insert, may be inserted into the pathway formed by the alignment of the first receiving member 716 and the second receiving member 718 to lock the connection. In this way, the tubulars 610, 710, and the coupling member 620, are prevented from becoming unthreaded or unmade.

The connector arrangement 600 shown in FIGS. 6–9 is but one example of a connector of the present invention. Other arrangements and embodiments may be utilized within the spirit and scope of the present invention. For example, a second embodiment (not shown) of the invention would consist of the two externally threaded male tubulars employing threads of the same direction (either right-hand or left-hand). An internally threaded coupling member would also be used. However, in this arrangement, the thread sets of the coupling member would be reversed, for example, right-over-right instead of right-over-left to ensure that the tubulars are drawn together by rotation of the coupling in a single direction.

Another embodiment includes female threads for the each of the two tubular members, and male threads for the coupling member. The configuration of the threads would again be arranged so that rotation of the coupling in a single direction will draw the two tubulars together.

Still another embodiment includes any of the above embodiments, but utilizing a retaining device other than threads. The only requirement is that the retaining device maintains the castellations interlocked together and provides the necessary tensile capacity required of the connection.

While the foregoing is directed to embodiments of the present invention, other and further embodiments of the invention may be devised without departing from the basic scope thereof, and the scope thereof is determined by the claims that follow.

What is claimed is:

1. A connection between wellbore tubulars comprising:
   a first tubular having a first continuous helical groove formed substantially around an exterior surface of one end of the first tubular; and
   a second tubular having a second continuous helical groove formed substantially around an interior surface of one end of the second tubular; wherein the first groove and the second groove form a continuous helical pathway when the first tubular is threadedly connected to the second tubular, the pathway for receiving a locking member therein to prevent relative rotation between the tubulars.

2. The connection of claim 1, wherein the first tubular has threads disposed adjacent to the first groove.

3. The connection of claim 1, wherein the second tubular has threads disposed adjacent to the end.

4. The connection of claim 1, wherein the pathway is formed between the alignment of the groove of the first tubular and the groove of the second tubular, whereby the groove on the second tubular is designed to mate with the groove on the first tubular.

5. The connection of claim 4, wherein the locking member is a wire.

6. The connection of claim 4, wherein the locking member comprises a plurality of wires insertable into the pathway.

7. The connection of claim 4, wherein the insertion of the locking member into the pathway formed by the alignment of the groove on the first tubular and the groove on the second tubular serves to prevent relative rotation between the tubulars.

8. The connection of claim 1, wherein the first tubular is a male threaded connector.

9. The connection of claim 1, wherein the second tubular is a female threaded connector.

10. The connection of claim 4, wherein the pathway extends through the surface of the tubulars, the pathway is accessible from the outside of the tubulars through a port disposed on the tubulars.

11. The connection of claim 1, wherein the first groove of the first tubular is formed at an upper end of the first tubular and terminates at a location proximate the threads formed on first tubular.

12. The connection of claim 1, wherein the second groove of the second tubular is formed at an upper end of the second tubular and terminates at a location proximate the threads disposed on the second tubular.

13. The connection of claim 1, wherein:
   the first tubular having a third groove disposed on the exterior of the first tubular; and
   the second tubular having a fourth groove formed on the interior of the second tubular.

14. The connection of claim 13, wherein alignment of the third groove and the fourth groove form a second pathway.

15. The connection of claim 13, whereby the third and fourth grooves are designed to accommodate an additional locking member between the first and second tubulars.

16. The connection of claim 14, further comprising a second locking member designed to be inserted into the second pathway formed by the third and fourth grooves.

17. The connection of claim 16, wherein the second locking member comprises a plurality of wire inserts.

18. The connection of claim 13, wherein the third and fourth grooves have helical profiles.

19. The connection of claim 16, wherein the insertion of the second locking member into the second pathway formed by the alignment of the third and fourth grooves serves to prevent relative rotation between the tubulars.

20. A connection between male and female wellbore tubulars members, the connection comprising:
at least one helical profile formed on a surface of each member where at least one of these profiles is a helical groove, and where the two helical profiles are of different direction and/or lead, the grooves alignable to permit the introduction of at least one locking member into the connection via a port formed in the members, the locking member preventing rotation of the members with respect to each other.

21. A method of connecting two wellbore tubulars comprising:
threading a first tubular to a second tubular, the first tubular having a first continuous helical groove disposed substantially around an exterior surface of the first tubular and male disposed distal to the first groove, the second tubular having a second continuous helical groove disposed substantially around an interior surface of the second tubular and female threads disposed distal to the second groove, the threads of the first tubular being threadedly connected to the threads of the second tubular so that rotation of a tubular member serves to draw the first tubular and the second tubular towards each other; and
aligning the first groove with the second groove to form a continuous helical pathway; and
inserting a locking member into the pathway to prevent relative rotation between the first and second tubulars.

22. A connection between wellbore tubulars comprising:
a first tubular having a first groove with a continuous helical profile formed on an exterior surface of one end of the first tubular; and
a second tubular having a second groove with a continuous helical profile formed on an interior surface of one end of the second tubular; wherein the first groove and the second groove form a pathway when the first tubular is connected to the second tubular and a threaded connection is made up, the pathway for receiving a locking member therein to prevent relative rotation between the tubulars.

23. The connection of claim 22, wherein there is a difference in lead between the first groove disposed on the first tubular and threads disposed on the first tubular.

24. The connection of claim 22, wherein there is a difference in direction between the first groove disposed in the first tubular and threads disposed on the first tubular.

25. The connection of claim 22, wherein there is a difference in lead between the second groove disposed on the second tubular and threads disposed on the second tubular.

26. The connection of claim 22, wherein there is a difference in the direction between the second groove disposed on the second tubular and threads disposed on the second tubular.

27. The connection of claim 22, wherein the continuous helical grooves are formed at a reverse angle from threads disposed on the tubulars.

28. A connection between wellbore tubulars comprising:
a first tubular having a first and a second groove formed on an exterior surface of one end of the first tubular;
a second tubular having a third and a fourth groove formed on an interior surface of one end of the second tubular; wherein the first groove and the third groove form a first pathway and the second groove and fourth groove form a second pathway when the first tubular is connected to the second tubular and the threaded connection is made up; and
a wire insert designed to be inserted into the second pathway formed by the second and fourth groove in order to prevent relative rotation between the tubulars.

29. A connection between wellbore tubulars comprising:
a first tubular having a first and a second groove formed on an exterior surface of one end of the first tubular; and
a second tubular having a third and a fourth groove formed on an interior surface of one end of the second tubular; wherein the first groove and the third groove form a first pathway and the second groove and fourth groove form a second pathway when the first tubular is connected to the second tubular and a threaded connection is made up, the second pathway is accessible from the outside of the tubulars through a port disposed on the tubulars, at least one of the pathways for receiving a locking member therein to prevent relative rotation between the tubular.

* * * * *